(12) United States Patent
Brueckner

(10) Patent No.: US 7,131,812 B2
(45) Date of Patent: Nov. 7, 2006

(54) SKY TURBINE THAT IS MOUNTED ON A CITY

(76) Inventor: Manfred Karl Brueckner, 5900 Rosedale Dr., Hyattsville, MD (US) 20782-2251

( * ) Notice: Subject to any disclaimer, the term of this patent is extended or adjusted under 35 U.S.C. 154(b) by 0 days.

(21) Appl. No.: 11/290,476

(22) Filed: Dec. 1, 2005

(65) Prior Publication Data
US 2006/0093483 A1 May 4, 2006

Related U.S. Application Data

(63) Continuation-in-part of application No. 10/909,324, filed on Aug. 3, 2004, now abandoned, which is a continuation-in-part of application No. 10/051,521, filed on Jan. 18, 2002, now abandoned.

(51) Int. Cl.
F03D 7/04 (2006.01)
(52) U.S. Cl. .................. 415/4.3; 415/4.5; 415/191; 416/37; 416/41; 416/48; 416/89; 416/120; 416/121; 416/223 R; 416/243; 416/DIG. 2; 416/DIG. 5; 416/DIG. 6
(58) Field of Classification Search .......... 415/4.1–4.5, 415/2.1, 905, 907, 908, 191, 208.1, 208.2; 416/37, 41, 48, 87–89, 120–121, 223 R, 416/223 A, 243, DIG. 2, DIG. 5, DIG. 6; 290/44, 55; 244/35 R
See application file for complete search history.

(56) References Cited

U.S. PATENT DOCUMENTS

| 1,556,715 | A | 10/1925 | Riggs |
| 1,757,667 | A | 5/1930 | Hesse |
| 2,108,245 | A | 2/1938 | Ash, Jr. |
| 2,173,291 | A | 9/1939 | Ash |
| 2,388,377 | A | 11/1945 | Albers |
| 2,713,393 | A | 7/1955 | Isacco |
| 2,776,017 | A | 1/1957 | Alexander |
| 2,869,649 | A | 1/1959 | Lux |
| 3,995,972 | A | 12/1976 | Nassar |
| 4,045,144 | A | 8/1977 | Loth |

(Continued)

FOREIGN PATENT DOCUMENTS

CH 170548 9/1934

(Continued)

OTHER PUBLICATIONS

Electric Power from the Wind—II, Electrical World, May 12, 1945, pp. 102-104.

(Continued)

*Primary Examiner*—Christopher Verdier
(74) *Attorney, Agent, or Firm*—Stephen Christopher Swift; Swift Law Office

(57) ABSTRACT

A sky turbine, having impeller blades with a plurality of panels that can telescope inward and outward. The pitch of the panels can be adjusted, and the pitch of each panel on a blade, passing from the innermost panel to the outermost panel, differs from the pitch of the previous panel by a certain adjustable amount. The sky turbine is preferably mounted above a city at a sufficiently high elevation that air current will be generally faster than just above the ground. In the preferred embodiments, a wing with two pods is pivotally mounted on a tower. Each pod has front and rear shafts, from which four blades extend. Servomotors cause the wing to turn so that its center of symmetry is parallel to the direction the sky is moving, cause the pitch of the panels of the blades to change, and cause the panels of the blades to telescope.

8 Claims, 14 Drawing Sheets

U.S. PATENT DOCUMENTS

| | | |
|---|---|---|
| 4,065,225 A | 12/1977 | Allison |
| 4,068,131 A | 1/1978 | Jacobs et al. |
| 4,183,717 A | 1/1980 | Yamada |
| 4,257,736 A * | 3/1981 | Jacobs .......................... 416/89 |
| 4,374,631 A | 2/1983 | Barnes |
| 4,500,259 A | 2/1985 | Schumacher |
| 4,710,101 A | 12/1987 | Jamieson |
| 4,878,807 A | 11/1989 | Baker |
| 5,313,103 A | 5/1994 | Hickey |
| 5,609,472 A | 3/1997 | Obukata et al. |
| 5,630,705 A | 5/1997 | Eikelenboom |
| 6,361,279 B1 | 3/2002 | Rodde et al. |
| 6,612,810 B1 | 9/2003 | Olsen et al. |
| 6,726,439 B1 | 4/2004 | Mikhail et al. |

FOREIGN PATENT DOCUMENTS

| | | |
|---|---|---|
| GB | 252461 | 5/1926 |
| JP | 57-32074 | 2/1982 |
| SU | 992804 | 1/1983 |
| SU | 1276849 | 12/1986 |

OTHER PUBLICATIONS

Handbook of Airfoil Sections, Rice, Michael, 1971, p. 47.

Marks' Standard Handbook, 9th Edition, 1987, p. 9-173, Fig. 9.11.18.

Mechanical Engineering Review Manual, 7th Edition, Lindeburg, Michael R., 1984, p. 5-17, Figure 5.12.

* cited by examiner

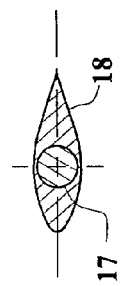
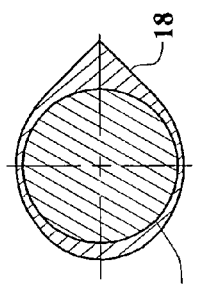
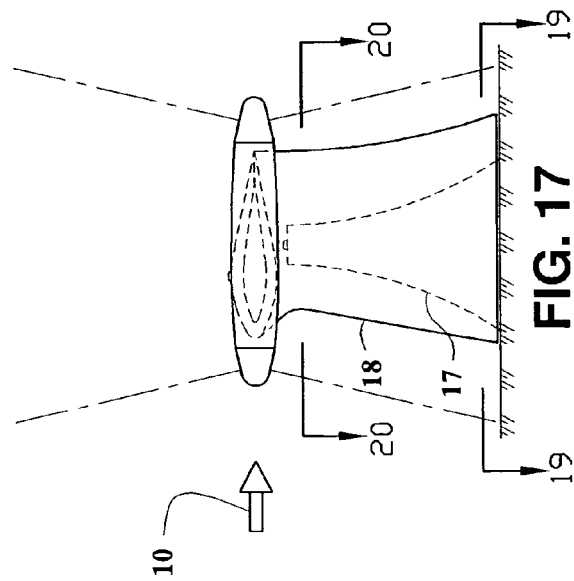
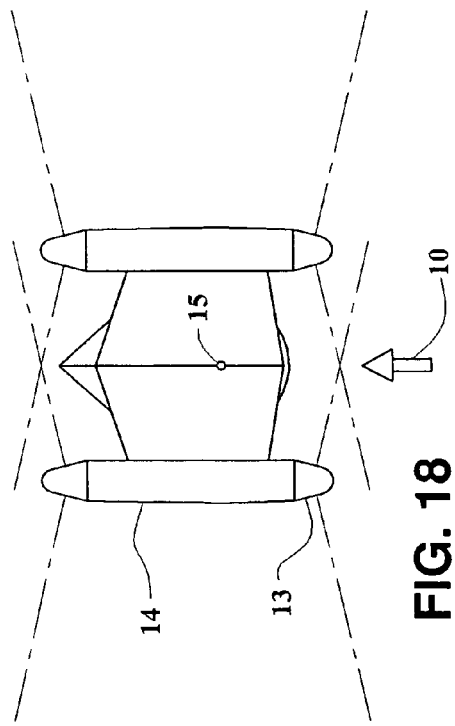
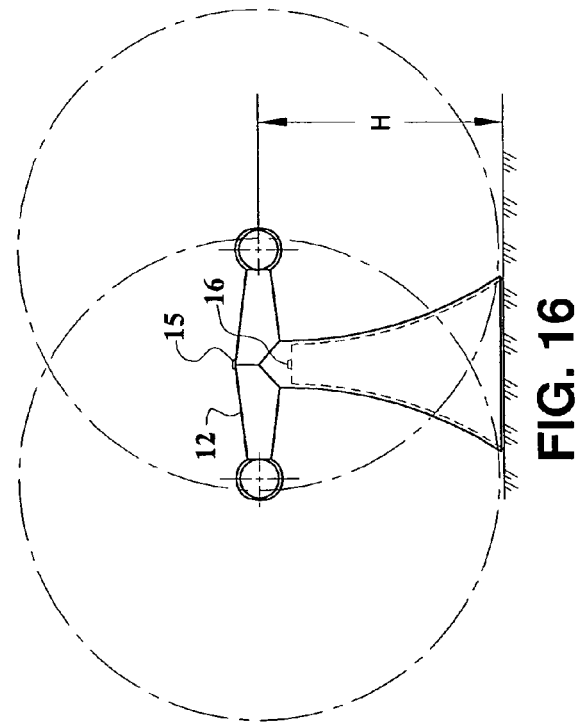

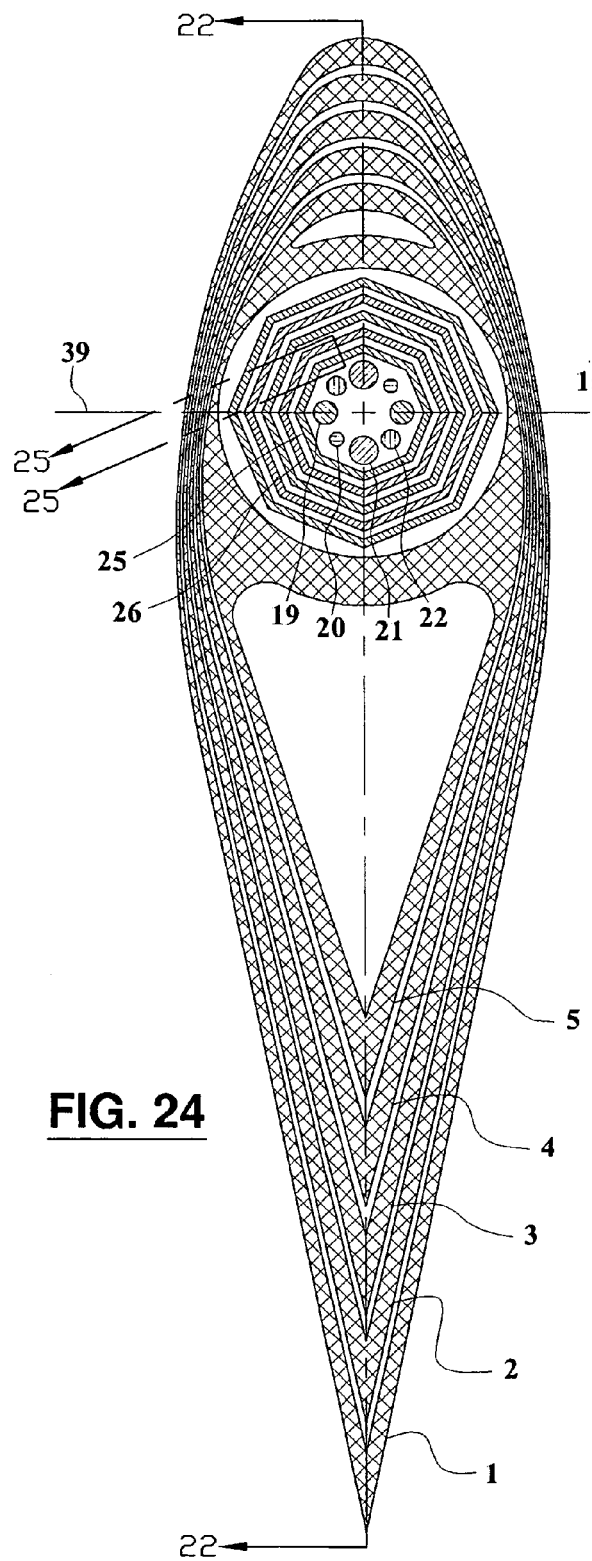
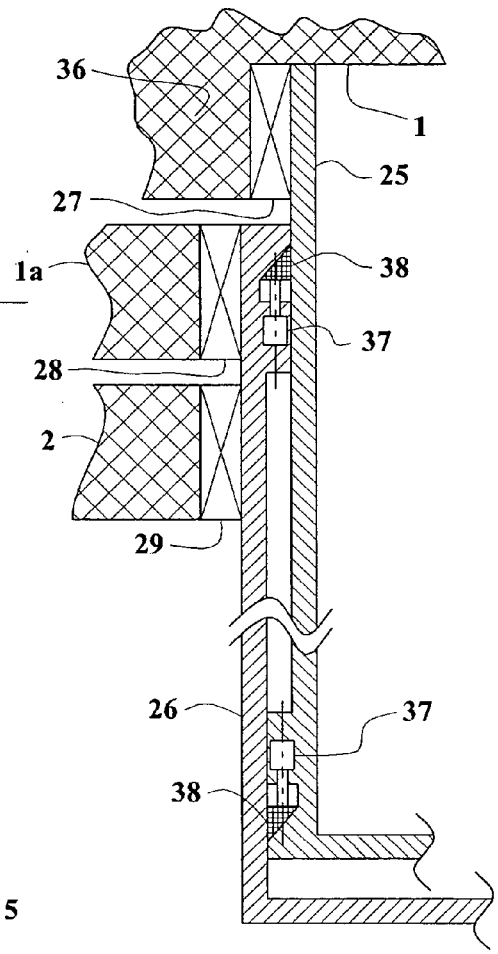
FIG. 24
FIG. 25

SKY TURBINE THAT IS MOUNTED ON A CITY

CROSS REFERENCE TO RELATED APPLICATION

This application is a Continuation-In-Part of Regular Utility patent application Ser. No. 10/909,324, filed on Aug. 3, 2004, now abandoned, which is a Continuation-In-Part of Regular Utility patent application Ser. No. 10/051,521, filed Jan. 18, 2002, now abandoned.

BACKGROUND OF THE INVENTION

1. Field of the Invention

The present invention relates to turbines for generating electrical power from the motion of air in the sky relative to the ground, or "sky motion" (the motion that moves the clouds across the skies), which may be mounted on top of a city.

2. Description of the Prior Art

Mankind's recorded history began in the stone age, then continued in the bronze age and the iron age, to our present age, the industrial revolution. At the present time, electricity is produced by hydroelectric dams, atomically or by the burning of hydrocarbons. Production of electricity by hydroelectric dams is limited and is also destructive to the environment. The burning of coal deposits mercury and acid rain into the environment. Toxic ash must also be disposed of. Nuclear power production is plagued with the problem of long term storage of radioactive waste. In 1954, Lewis Strauss, Chairman of the Atomic Energy Commission, said that atomic reactors might someday produce such an abundance of energy that electricity would become "too cheap to meter". What nuclear power failed to do, sky power using the present invention may accomplish. It will be the backbone of our next age, the solar age, in which all our energy needs are satisfied by power currently provided by the sun.

U.S. Pat. No. 1,556,715, issued on Oct. 13, 1925, to William Monroe Riggs, discloses a windmill, including plural shafts with blades, but does not disclose that the blades extend from the shafts, with each blade having at least three telescoping panels, such that the angles of the panels are adjustable, with rotation of the shafts being used to generate electricity, as in the present invention.

U.S. Pat. No. 1,757,667, issued on May 6, 1930, to Erich Hesse, discloses a device for regulating wind wheels to obtain a uniform rotational speed, by changing the pitch of their vanes with rods in the arms on which the vanes are located. The instant invention is distinguishable, in that the blades of the turbine can be telescopically extended (in low sky speed) or retracted (in high sky speed) to regulate their length (and thereby their "aspect ratio", i.e., the ratio of length to width) according to the speed of the sky.

U.S. Pat. No. 2,108,245, issued on Feb. 15, 1938, to Thomas Ash, Jr., discloses a gyratory airplane wing, with telescoping blade sections.

U.S. Pat. No. 2,173,291, issued on Sep. 19, 1939, to Thomas Leo Ash, discloses an aerodynamic rotor, with telescoping blade sections.

U.S. Pat. No. 2,388,377, issued on Nov. 6, 1945, to John R. Albers, discloses an electric wind plant, with parallel rotors joined by a wing.

U.S. Pat. No. 2,713,393, issued on Jul. 19, 1955, to Vittorio Isacco, discloses a telescopic blade for rotating wing aircraft.

U.S. Pat. No. 2,776,017, issued on Jan. 1, 1957, to Jesse B. Alexander, discloses a telescoping rotor for a helicopter.

U.S. Pat. No. 2,869,649, issued on Jan. 20, 1959, to Horst Dieter Lux, discloses a helicopter rotor with telescoping blade sections.

U.S. Pat. No. 3,995,972, issued on Dec. 7, 1976, to Esam M. Nassar, discloses wind machine with reciprocating blades mounted on top of a tall building.

U.S. Pat. No. 4,045,144, issued on Aug. 30, 1977, to John Lodewyk Loth, discloses a wind energy concentrator with a wing and parallel pods.

U.S. Pat. No. 4,065,225, issued on Dec. 27, 1977, to William D. Allison, discloses a multivane windmill, in which the pitch of the vanes can be changed in response to wind speed, to keep the speed of rotation constant. Again, the instant invention is distinguishable, in that the blades of the turbine can be telescopically extended or retracted to regulate their aspect ratio.

U.S. Pat. No. 4,068,131, issued on Jan. 10, 1978, to Marcellus L. Jacobs and Paul R. Jacobs, discloses a wind-driven electric power plant.

U.S. Pat. No. 4,183,717, issued on Jan. 15, 1980, to Motohiro Yamada, discloses a windmill structure with parallel rotors joined by a wing.

U.S. Pat. No. 4,257,736, issued on Mar. 24, 1981, to Dennis Jacobs, discloses a governed propeller type wind motor arrangement, in which the pitch of the blades is changed, but the blades do not telescope, as in the instant invention.

U.S. Pat. No. 4,374,631, issued on Feb. 22, 1983, to Dale R. Barnes, discloses a windmill speed limiting system utilizing hysteresis.

U.S. Pat. No. 4,500,259, issued on Feb. 19, 1985, to Berthold W. Schumacher, discloses a fluid flow energy converter, with several screws (or "helicoid structures") rather than propeller-like blades, as in the instant invention. It is disclosed in column 8, lines 45–49 that, "an ideal location for a wind mill is, for instance, the roof of a highrise building in a city. Of course, a special tower may also be built for carrying the helicoids." But its structure is completely different from that of the instant invention.

U.S. Pat. No. 4,710,101, issued on Dec. 1, 1987, to Peter M. Jamieson, discloses a wind turbine, with each blade having a fixed inner portion and an outer portion that can move outward to lengthen the blade, to increase drag and slow down rotation of the turbine. The instant invention is distinguishable in that it has several panels, not just two, that can telescope inward or outward, and it can regulate its speed of rotation by changing the angles in the panels in its blades.

U.S. Pat. No. 4,878,807, issued on Nov. 7, 1989, to Keith G. Baker, discloses a device for producing electricity from wind, having a vertical belt and interspaced hydrodynamic foil members. Its use in high rise buildings is disclosed in column 8, lines 13-21, but its structure is different from that of the instant invention, e.g., it has no telescoping blades.

U.S. Pat. No. 5,313,103, issued on May 17, 1994, to John J. Hickey, discloses an auger shaped fluid medium engaging member. Its use "on tops of roofs of a high rise building" is suggested in column 1, lines 66–67, but its structure is readily distinguishable from that of the instant invention, e.g., it has no telescoping blades.

U.S. Pat. No. 5,609,472, issued on Mar. 11, 1997, to Masahiro Obukata and Masaaki Nakadate, discloses a rotor blade for a rotary wing aircraft (such as a helicopter) having a different shape from the impeller blades of the instant invention.

U.S. Pat. No. 6,361,279, issued on Mar. 26, 2002, to Anne Marie Rodde, Joel Reneaux and Jean Jacques Thibert, discloses a blade profile for an aircraft rotor, again having a different shape from the impeller blades of the instant invention.

U.S. Pat. No. 6,612,810, issued on Sep. 2, 2003, to Kaj Olsen et al., discloses a wind turbine blade with a system for deicing and lightning protection.

U.S. Pat. No. 6,726,439, issued on Apr. 27, 2004, to Amir S. Mikhail and Geoffrey F. Deane, discloses a wind or water turbine with retractable rotor blades controlled by a computer responsive to wind or current velocity.

British Patent No. 252,461, complete specification accepted on May 27, 1926, inventor Kurt Bilau, discloses improvements in or related to wind-driven prime movers, including braking action by producing eddy currents in a slot or slots between displaced sections of the sail vane or the sail vane and a head piece, but not by telescoping as in the instant invention.

Swiss Patent No. 170,548, published on Sep. 17, 1934, to Hermann Honnef, discloses a wind turbine having plural rotors, mounted at heights of about 180 to 360 meters, where the speed of the air current is from about 3.25 to 3.75 time the air current speed on the ground, for the purpose of generating more power from higher air current speeds at greater heights.

Japanese Patent No. 57-32074, published on Feb. 20, 1982, inventor Teru Matsumiya, discloses a wind mill, with blades having a fixed inner member and an outer member that can retract inward into the inner member to reduce the wind receiving area, or extend outward from the inner member to increase the wind receiving area. The instant invention is distinguishable in that it has not just two, but several telescoping panels, which also have an adjustable pitch.

Soviet Patent No. 992,804, published on Jan. 30, 1983, discloses a wind motor rotor with telescopic blades, having a fixed part and a moving part. Again, the instant invention is distinguishable in that it has not just two, but several telescoping panels, which also have an adjustable pitch.

Soviet Patent No. 1,276,849, published on Dec. 15, 1986, discloses a wind power generator supporting frame, with plural shafts, but does not disclose blades extending from the shafts with telescoping, adjustable panels.

Electric Power from the Wind—II, Electrical World, May 12, 1945, pp. 102–104, discloses the possibility of generating electric power from wind, but only in limited areas, and that wind is faster above the surface of the ground.

Marks' Standard Handbook, $9^{th}$ Edition, 1987, p. 9–173, FIG. 9.11.18, discloses that the sky speed at an altitude of 350 meters is more than twice the wind speed on the ground.

Handbook of Airfoil Sections, Rice, Michael, 1971, p. 47, discloses that in a symmetrical airfoil, the center of pressure is stable for all angles of attack.

Mechanical Engineering Review Manual, 7th Edition, Lindeburg, Michael R., 1984, p. 5–17, FIG. 5.12, discloses that maximum efficiency takes place when the ratio of blade tip speed to air current speed is six to one.

None of the above inventions and patents, taken either singly or in combination, is seen to describe the instant invention as claimed.

SUMMARY OF THE INVENTION

The present invention is a sky turbine, which may be mounted atop a high rise city. Two main shafts are facing forward and two are facing aft. Both pairs are intermeshing and counter-rotating. There is no timing relationship between front and back. In fact, the front side may be shut down for maintenance while the back side continues producing power. The sky turbine is able to protect itself from high sky speeds. As the sky speed rises, the impeller blades have panels that can telescope inward, and they can also change their angles to the moving sky.

Accordingly, it is a principal object of the invention to produce cheap, clean, and abundant electric power for as long as there are air currents in the sky.

It is another object of the invention to reduce pollution of the environment.

It is a further object of the invention is to enable dams to be dismantled and salmon and other migratory fish to return to running in rivers and streams.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 16 is a front elevational view of the second embodiment of the invention.

FIG. 17 is a left side elevational view of the second embodiment of the invention.

FIG. 18 is a top plan view of the second embodiment of the invention.

FIG. 19 is a sectional view drawn along lines 19—19 of FIG. 17.

FIG. 20 is a sectional view drawn along lines 20—20 of FIG. 17.

FIG. 24 is a sectional view drawn along lines 24—24 of FIG. 22.

FIG. 25 is a sectional view drawn along lines 25—25 of FIG. 24.

DETAILED DESCRIPTION OF THE PREFERRED EMBODIMENTS

"Sky" is defined by applicant in this patent to include motion of air in the sky relative to the ground. However, the use of the sky turbine, as defined by the claims, at any altitude is within the scope of the invention.

Figures 1, 2:
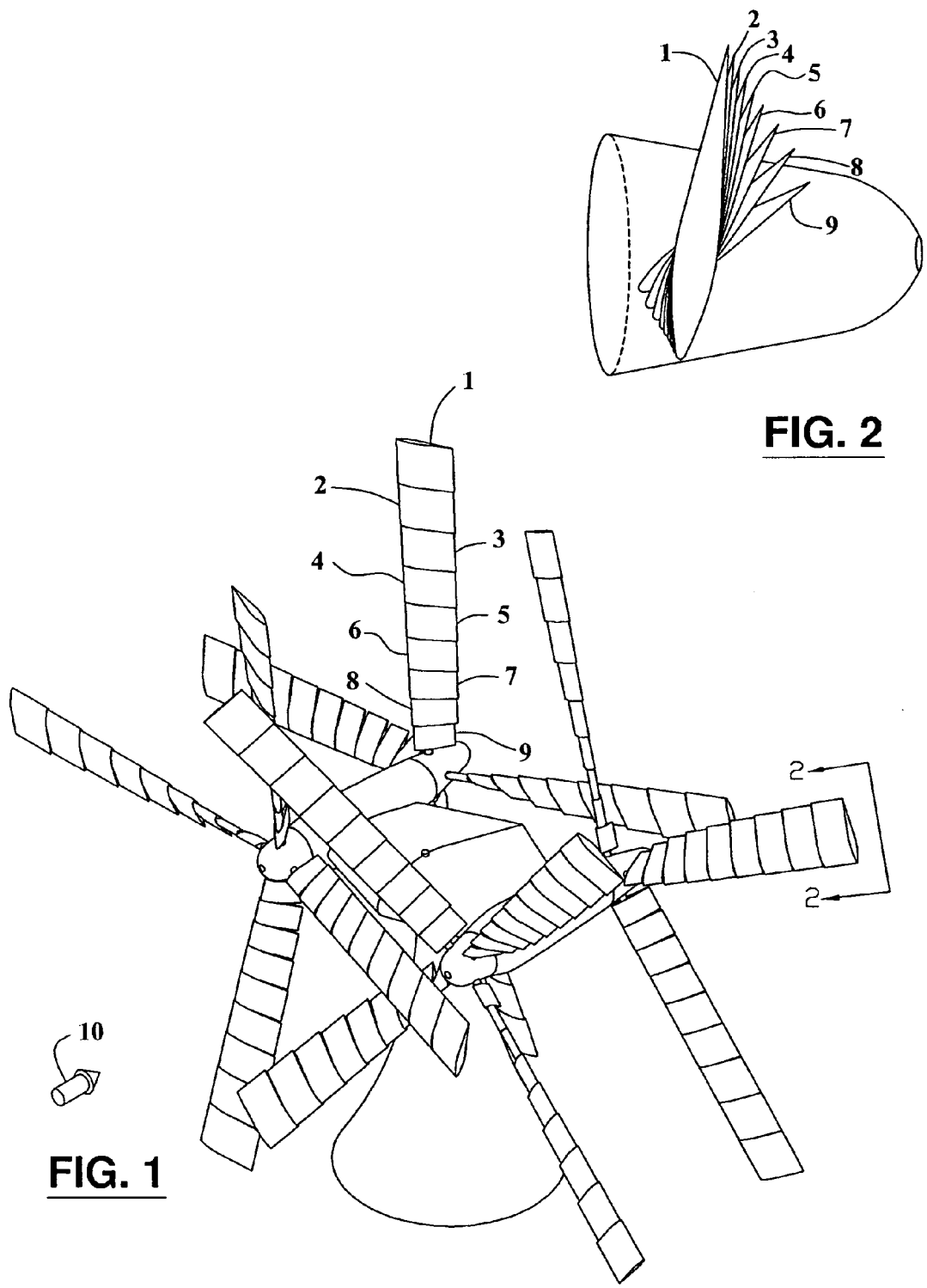
FIG. 1 is a perspective view of a sky turbine in the first preferred embodiment of the invention, with the blades fully extended.
FIG. 2 is a detail view of one impeller blade which is mounted at the left rear spinner.

FIG. 1 is a perspective view of a sky turbine in the first preferred embodiment of the invention. The invention will have this appearance when the sky speed is 2.7 meters/second (6 mph) or less. Each blade may have between five to twelve panels. The embodiment shown in FIG. 1 has nine panels, 1 through 9. Arrow 10 indicates the direction that the sky is moving.

FIG. 2 is an enlarged view of one impeller blade which is mounted at the left rear spinner. The angle (or "pitch") of the panels 1–9 is controlled by servomotors.

Figure 3:
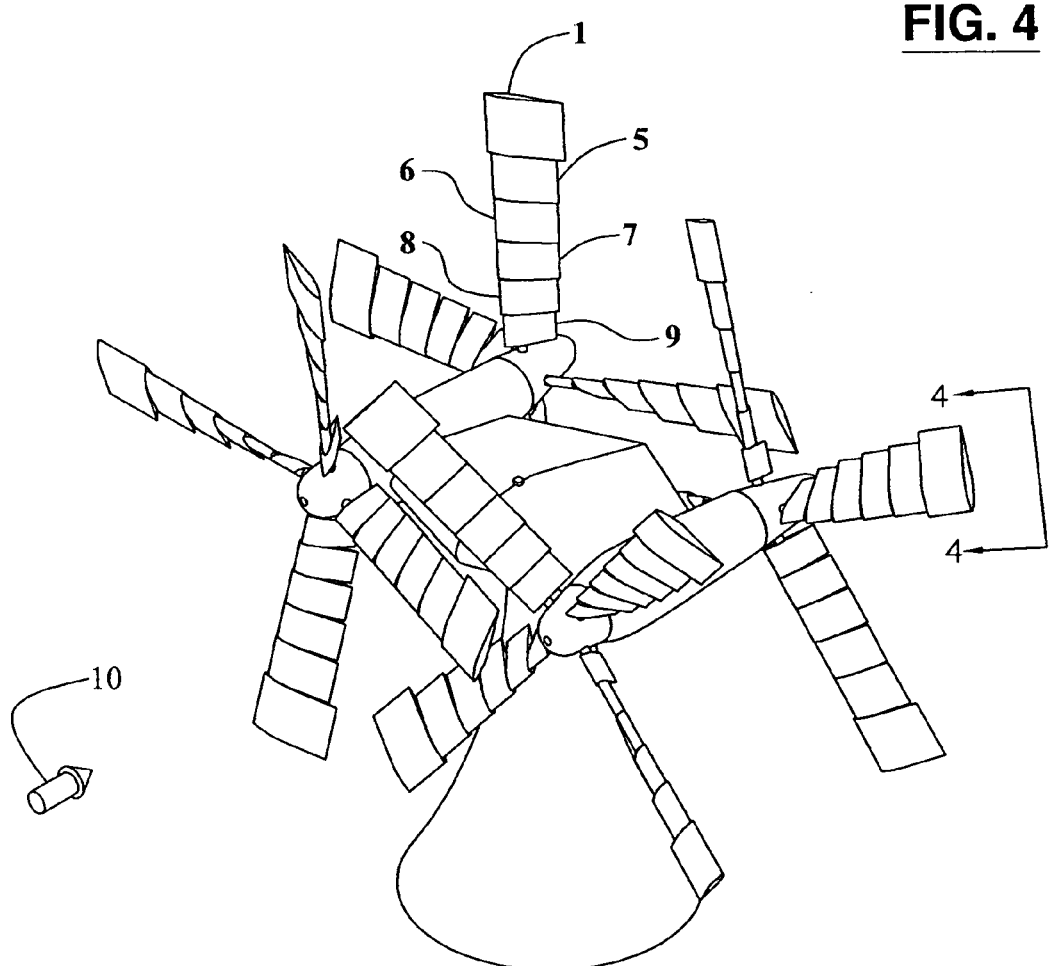
FIG. 3 is a perspective view of a sky turbine in the first preferred embodiment of the invention with panels 2 through 4 telescoped into panel 1.

FIG. 3 is similar to FIG. 1 but shows the invention as it would appear when the sky speed is between 5.8 and 7.6 meters/second (13 to 17 mph). Panels 2 through 4 have been telescoped into panel 1.

Figure 4:
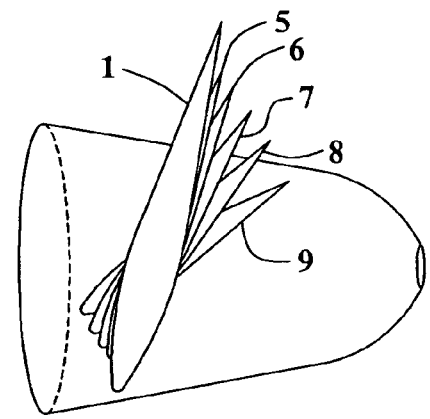
FIG. 4 is a detail view of one impeller blade which is mounted at the left rear spinner, with panels 2 through 4 telescoped into panel 1.

FIG. 4 complements FIG. 3.

Figure 5:
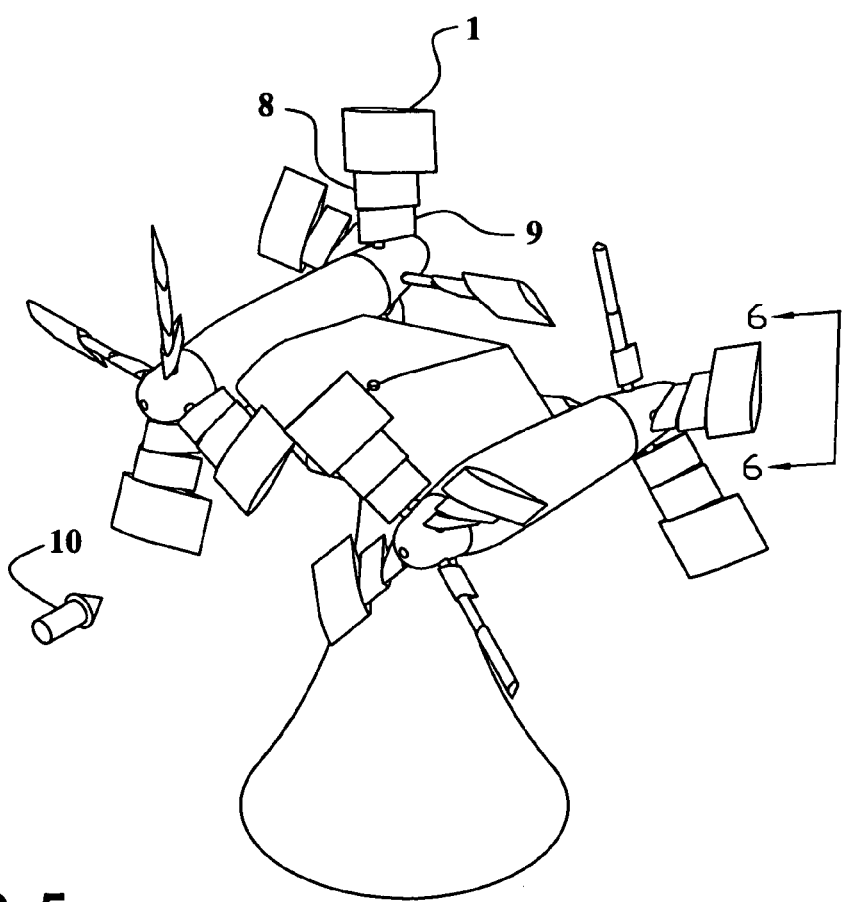
FIG. 5 is a perspective view of a sky turbine in the first preferred embodiment of the invention with panels 2 through 7 telescoped into panel 1.

FIG. 5 shows the arrangement of the invention as it would appear when it is facing a sky speed of between 14.3 and 21.5 meters/second (32 to 48 mph). Panels 2 through 7 have now been telescoped within panel 1.

Figure 6:
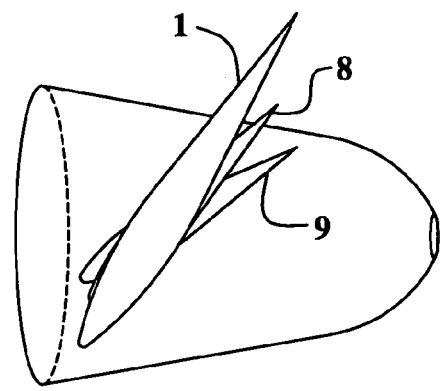
FIG. 6 is a detail view of one impeller blade which is mounted at the left rear spinner, with panels 2 through 7 telescoped into panel 1.

FIG. 6 complements FIG. 5.

Figure 7:
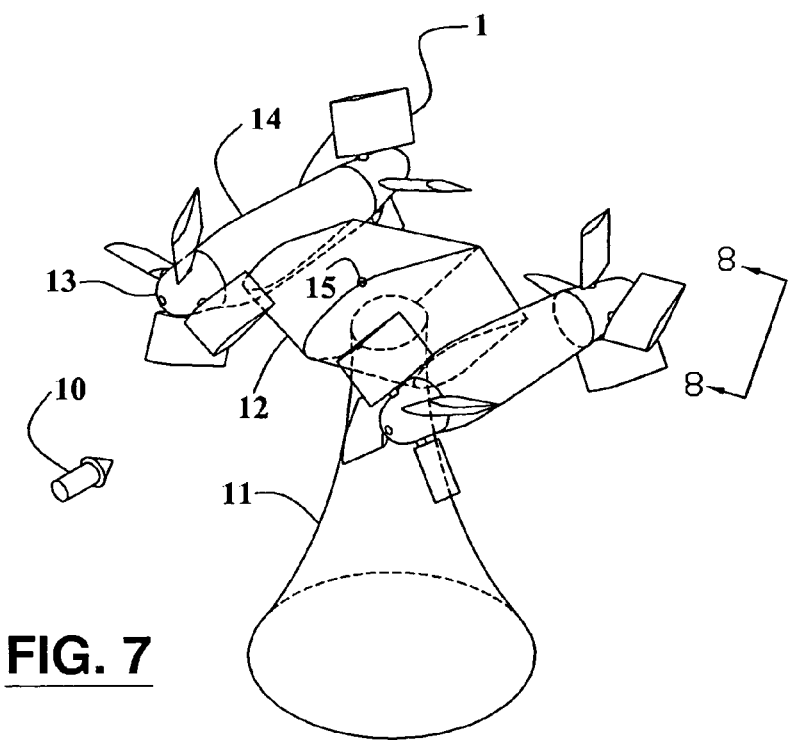
FIG. 7 is a perspective view of a sky turbine in the first preferred embodiment of the invention with panels 2 through 9 telescoped into panel 1.

FIG. 7 shows the invention when facing a sky speed greater than 21.5 meters/second (48 mph). Also shown is arrow 10 which is indicating the direction of the sky as it approaches the invention. Tower 11 contains the stationary portion of the city. Wing 12 connects the city to the two parallel pods. The right front spinner 13 is located in front of the right pod 14. Some of the cities most luxurious real estate is located just within the skin of the wing and pods. A weather station 15 located atop wing 12 contains an anemometer and a sky direction vane. A computer (not shown) located near the weather station 15 communicates with and commands (via digital radio signals) the various servomotors located throughout the blades. A pair of wires (not shown) are strung the length of each spar. Continuity from spar to spar is maintained by electric brushes. Thus, power is provided to all servomotors within the blade. The computer is programed with the formula, $$\tan\beta = \frac{P}{N(2\pi r)}$$

where tan $$\beta = \frac{1}{6}$$

when N=1 and $$P = \frac{\pi r}{3}$$

(which is the standard value for P) wherein:

β is the panel's angle as measured perpendicularly from the axis of rotation;

P is the distance that the impeller blades advance forward through the moving sky in one revolution;

r is the radius of the impeller's diameter when its blades are fully extended; and N is a number between zero and one (being zero at the center of the impeller and one at the tips of its blades), and is the fractional radius of the panel, i.e., the distance of the panel from the center divided by r.

The computer may choose to alter the speed of rotation by adjusting the standard P. P is inversely related to speed of rotation; i.e., a shorter P means faster rotation, and a longer P means slower rotation. Servomotors are also mounted on tower 11 to keep wing 12 facing arrow 10, the direction of the approaching sky.

Figure 8:
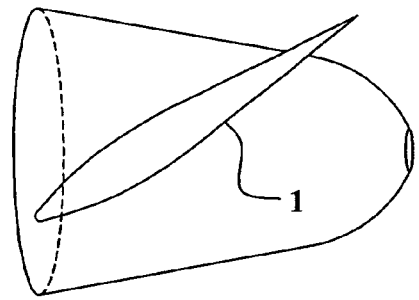
FIG. 8 is a detail view of one impeller blade which is mounted at the left rear spinner, with panels 2 through 9 telescoped into panel 1.

FIG. 8 complements FIG. 7.

Figure 9:
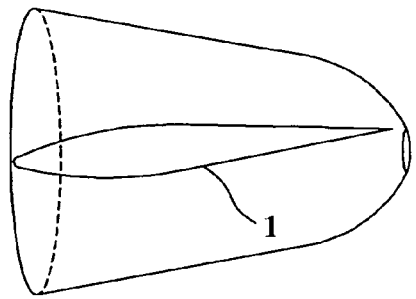
FIG. 9 is a detail view of one impeller blade which is mounted at the left rear spinner, with panels 2 through 9 telescoped into panel 1, with panel 1 having a lower pitch than in FIG. 8.

FIG. 9 is similar to FIG. 8, but shows that the computer has set the blades to a low angle of attack as the invention faces a hurricane (i.e., a longer P than is standard). This maneuver is merely a pitch change; the invention continues to produce power.

Figure 10:
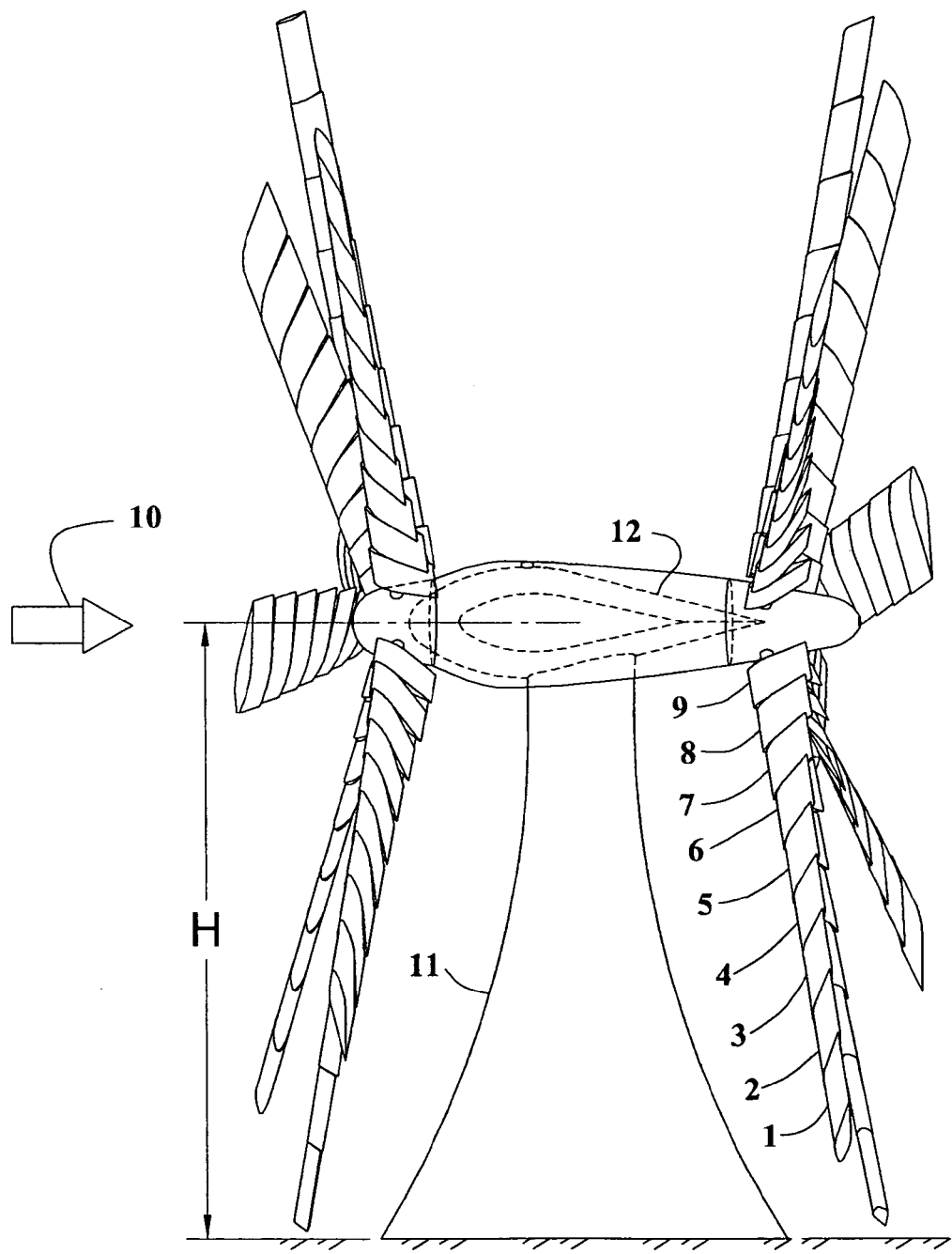
FIG. 10 is a left side elevational view of the turbine of the first preferred embodiment of the invention.

FIG. 10 is a left side elevational view of the turbine of the first preferred embodiment. Dimension H is the height as measured from the ground.

Figure 11:
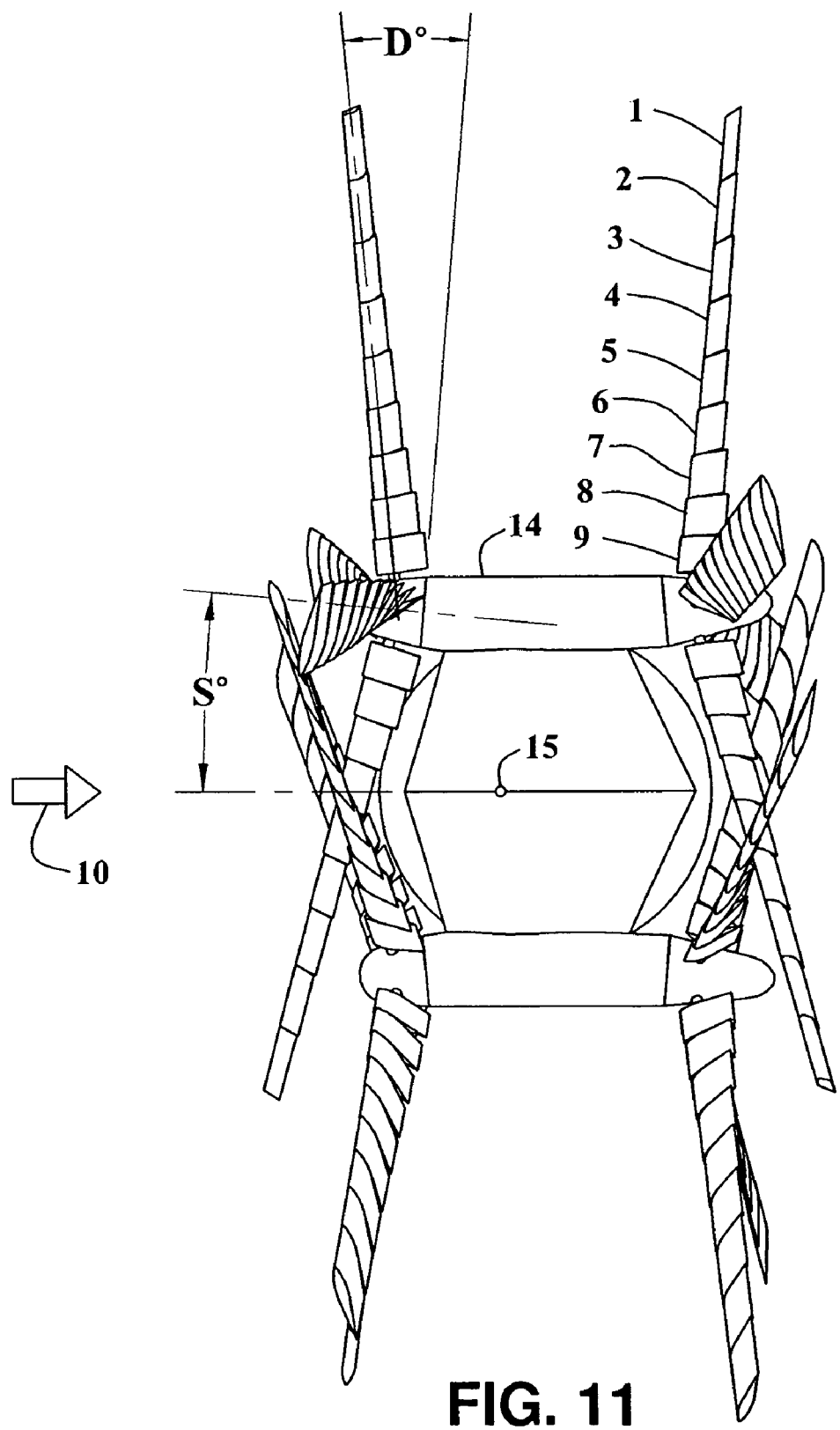
FIG. 11 is a top view of the first preferred embodiment of the invention.

FIG. 11 is a top view of the present invention. Dimension D° is the dihedral angle of the blades with respect to the spinner and dimension S° is the skew angle between the spinner and the center of symmetry. The sky speed above an altitude of 350 meters (1148 feet) is more than two times the wind speed at the ground. (Marks' Standard Handbook, 9*th* Edition, 1987, p. 9–173, FIG. 9.11.18). The skew angle subtracts the angle of attack at the top of the swing and adds the angle of attack at the bottom of the swing. With the right front blades rotating clockwise (when viewed from the front), the skew angle will automatically compensate for the difference of the sky speed at the various altitudes. When dimension H is 1.61 kilometers (1 mile) or more the skew angle is not needed.

Figures 12, 13:
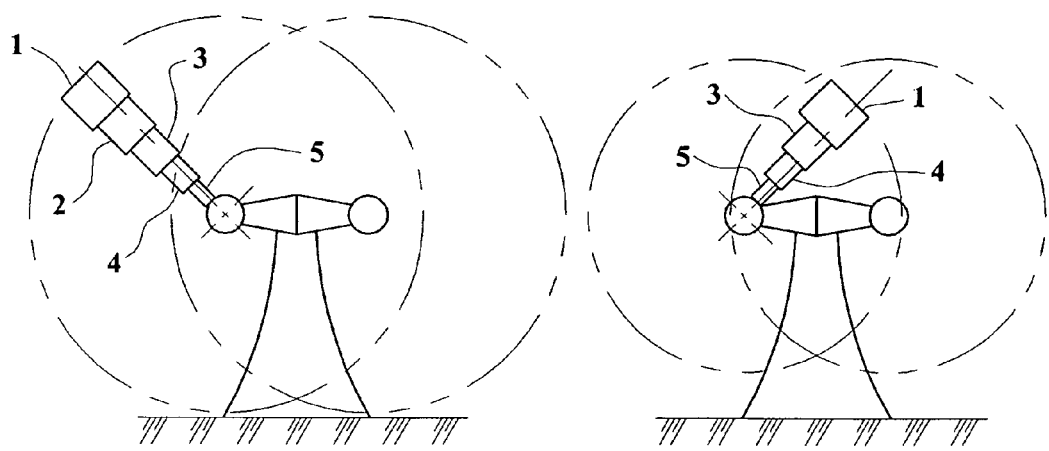
FIG. 12 is a schematic front elevational view showing one blade in a first rotational angle, with panel 1 in an extended position.
FIG. 13 is a schematic front elevational view showing the blade in a second rotational angle, with panel 1 in a retracted position.

FIG. 12 and FIG. 13 shows the telescoping of panel 1 over panel 2 in 90° of the blade swing. This is possible because the blades rotate quite slowly. The speed of the tip of the blades is about six times the speed of the sky.

Or $$RPM = \frac{kS_s}{R}$$

whereby

RPM: revolutions per minute of the blades k: a constant 57 (84)

$S_s$: mean sky speed in M/S (mph)

R: the total radius of the blades in meters (feet)

The reciprocal of the RPM is the number of minutes required to complete one revolution.

The falling motion is powered by gravity and this fall is checked by servomotors located inside the blade.

Figures 14, 15:
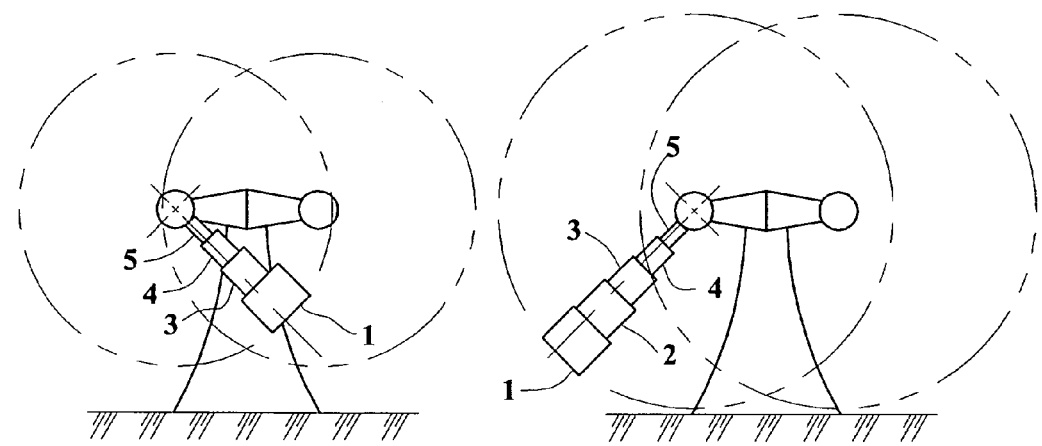
FIG. 14 is a schematic front elevational view showing the blade in a third rotational angle, with panel 1 in the retracted position.
FIG. 15 is a schematic front elevational view showing the blade in a fourth rotational angle, with panel 1 returned to the extended position.

FIG. 14 and FIG. 15 shows the inverse of FIG. 12 and FIG. 13. Panel 1 extends downward during 90° of blade rotation and this fall is again due to gravity.

FIG. 16 through FIG. 20 shows the various aspects of the second preferred embodiment of the invention. This embodiment differs from the first embodiment in that the wing 12 is integral with the city 18. Both are suspended by tower 17. In the version shown there is no skew angle, therefore, additional dihedral must be used. Reference 16 is a two channel rotating union allowing fresh water to enter the city and sewage to exit. FIGS. 19 and 20 are sections taken through FIG. 17.

Figure 21A:
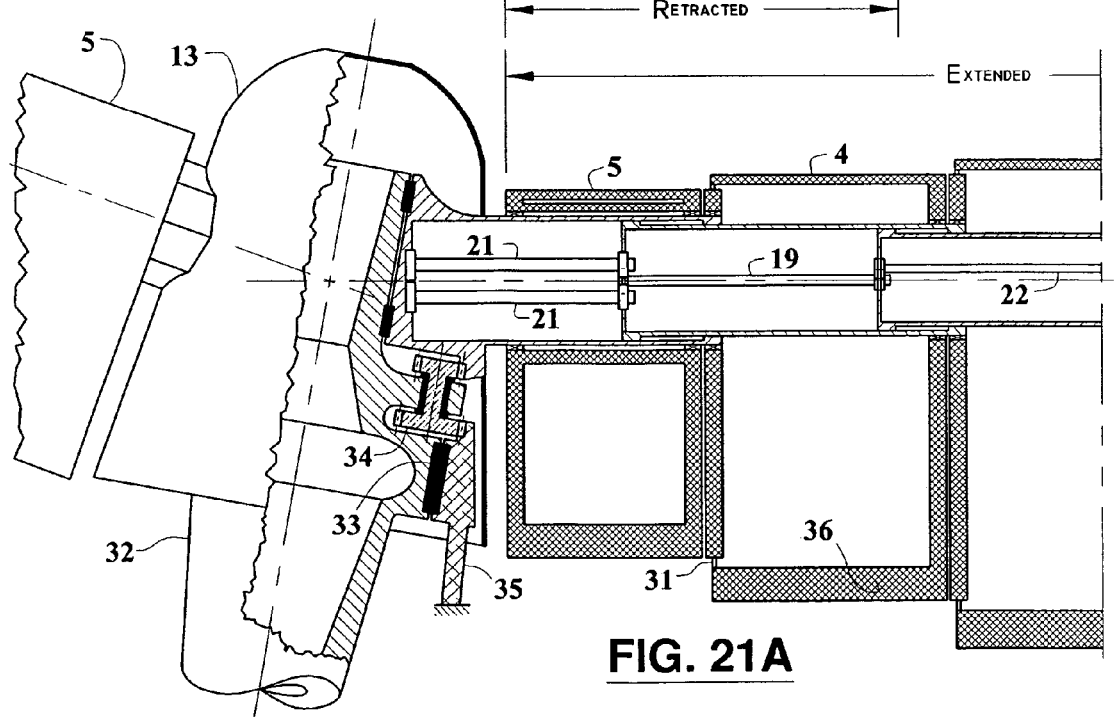
FIG. 21A and FIG. 21B are a single sectional view through a blade in either preferred embodiment of the invention, with the blade having five panels that are extended.
Figure 21B:
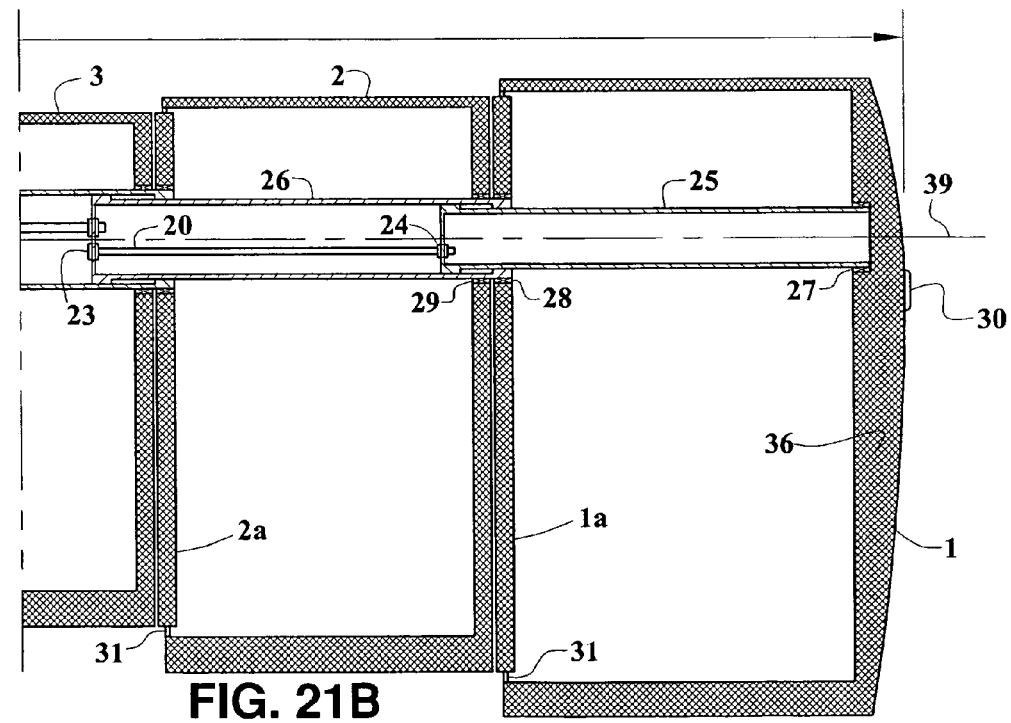

FIG. 21A and FIG. 21B are sections through a five-paneled blade. This blade is shown at maximum extension (or "aspect ratio") with a zero angle of attack on all panels (i.e., "full feathered"). Each panel is equipped with electrical deicing and a seal 31. This seal keeps out moisture and strips off any residual ice when the panels are in relative motion. Planetary gear 34 is a hypocycloid roller gear with pure rolling contact, that increases the speed of the main shaft 32 to 25.5 times faster than the spinner 13. (I.e., gear 34 is a smaller gear, with rollers in place of teeth, that meshes inside a larger gear with teeth on its inside.) The main shaft 32 is held to the stationary structure 35 by bearing 33. A light structural lattice 36 is provided to give the panels' airfoil a semi-monocoque strength (i.e., deriving most of its strength from its skin).

Figure 22:
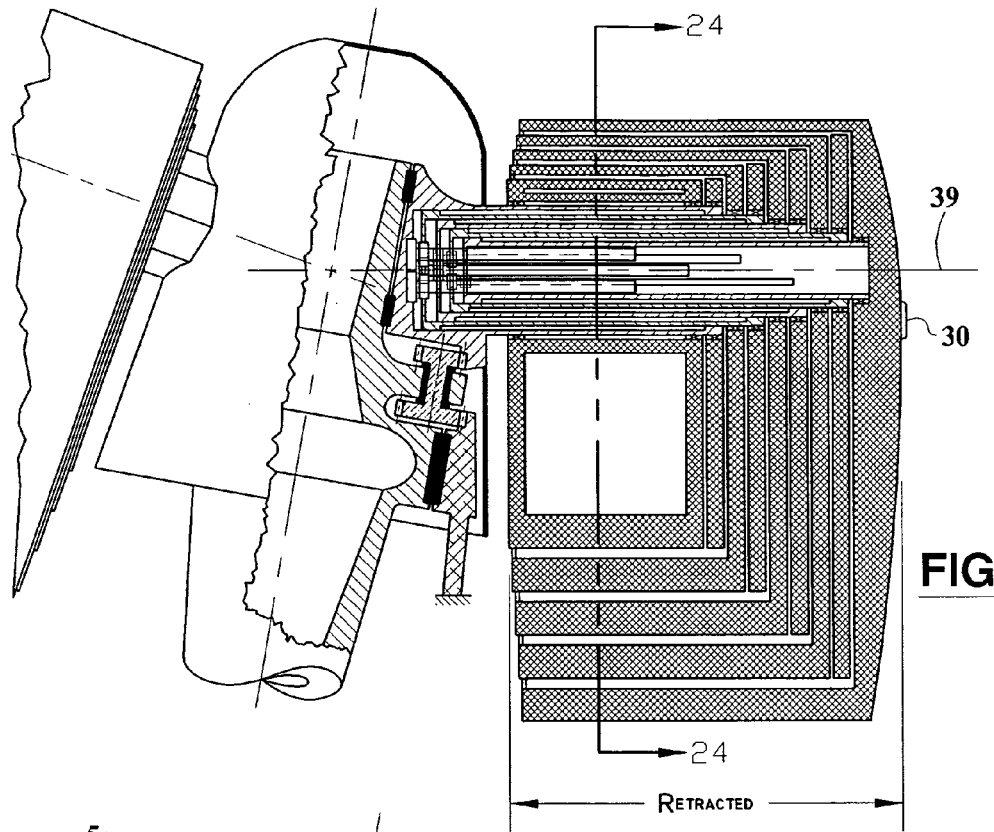
FIG. 22 is a sectional view through a blade in either preferred embodiment of the invention, with the blade having four panels that are retracted.

FIG. 22 is a retracted configuration of FIG. 21 (with the smallest possible aspect ratio). Typically the number of panels range between 5 and 12. The difference in aspect ratio of a fully extended blade to a fully retracted blade is a function of the total number of panels. Therefore, the more panels that are fitted, the more the aspect ratio and the size of the sky receiving surface can be changed, and the better the invention can protect itself from violent storms. Strobe light 30 warns approaching aircraft.

Figure 23:
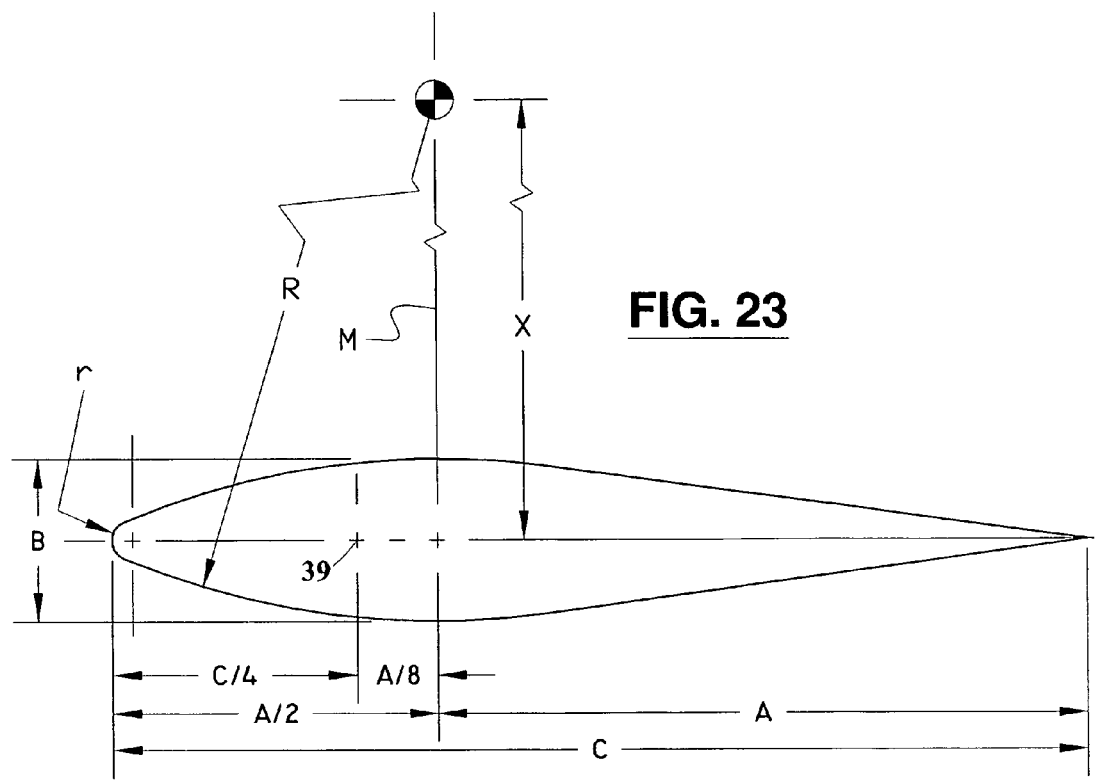
FIG. 23 is a schematic sectional view of the airfoil of the panel's skin.

FIG. 23 is the airfoil of the panel's skin. This airfoil is symmetrical. The center of pressure is stable for all angles of attack. (Handbook of Airfoil Sections, Rice, Michael, 1971, p. 47). This airfoil cannot flutter (or "shimmy"). Chord C is the total length. The maximum width B is located ⅓ of the chord as measured from the front. ⅓ chord also equals ½

Thus $$\frac{C}{3} = \frac{A}{2} \quad \text{or} \quad \frac{C}{1.5} = A$$

And the leading edge radius $$r = \frac{B^2}{2A}$$

Furthermore $$X = \frac{A^3 - 3AB^2 + 2B^3}{4B(A - B)}$$

Finally $$R = X + \frac{B}{2}$$

Both the chord C and dimension B may be arbitrarily chosen. Center 39 is the center of gravity of the airfoil and the axis of the telescoping octagonal mono-spar. Line M is perpendicular to chord C and located at distance A from the trailing edge of the airfoil. Radius R is centered on line M. The airfoil has straight portions tangent to the radius R and its trailing edge.

FIG. 24 is a section taken through FIG. 22. Each panel (except the innermost panel) is equipped with two ball screws 19 through 22. (This figure has distorted proportions for the sake of clarity).

FIG. 25 is a section taken through FIG. 24. Each panel is equipped with an inner and an outer servomotor. These two servomotors work together simultaneously to position and hold each panel to its proper angle, as specified by the computer. Servomotor 27 is the outer servomotor and servomotor 28 is the inner servomotor for panel 1. Servomotor 29 is the outer servomotor for panel 2.

Figure 26:
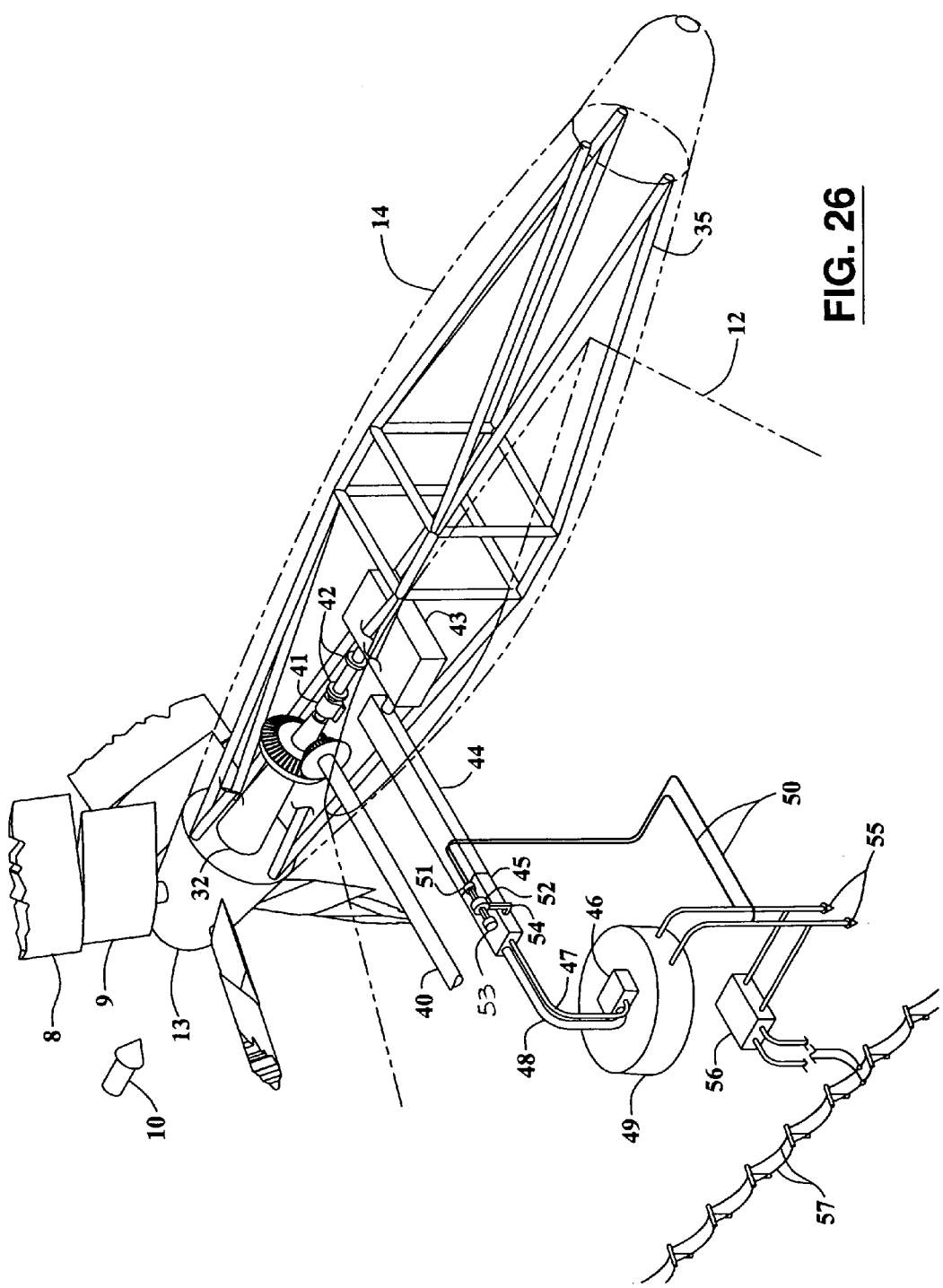
FIG. 26 is a perspective view of the inside of the right hand pod in either preferred embodiment of the invention.

FIG. 26 is an isometric view of the inside of the right hand pod 14. Main shaft 32 is rotating 25.5 times faster than spinner 13. Shaft 40 synchronizes the right main front shaft to the left main front shaft. The main shaft 32 is supported by pillow block 41 at its back end. Two universal joints 42 remove the skew angle before providing the nine speed gear box 43 with input. The output of this gear transmission 43 is fed into a bank of fixed displacement oil pumps 44 and also into a small bank of variable displacement pumps 45. The combined oil pumped is fed to a fixed displacement hydraulic motor 46 through pipe 47 and returned to the pumps by pipe 48. The motor 46 is directly coupled to A.C. generator 49. A small sample of electric power is taken from generator 49 by wires 50 and fed to a synchronous motor 51. The speed of motor 51 is compared by differential 52 to a clock 53. If generator 49 is operating off frequency, variable displacement pumps 45 are readjusted through feedback tube 54. A.C. power from generator 49 is supplied to all local loads by wire 55. Location 56 contains equipment to convert A.C. to D.C. This D.C. is sent worldwide by power grid 57. On rare occasions when the sky speed falls below 4 mph, the sky turbine may no longer have sufficient strength to supply its designated area with A.C. power. In that situation, D.C.

power is borrowed from grid 57 and converted back to A.C. by 56 to be used locally through wires 55.

Figure 27:
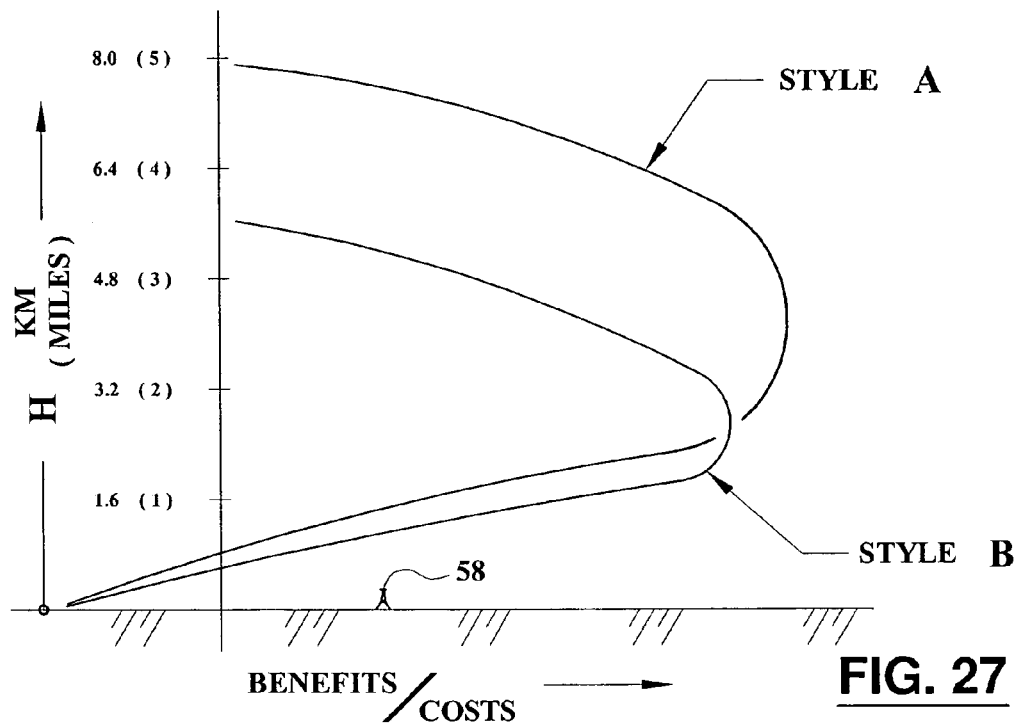
FIG. 27 is a diagram showing the relative efficiency of investment capital with respect to height H.

FIG. 27 shows the relative efficiency of investment capital with respect to dimension H. "STYLE A" is the first preferred embodiment of the invention; "STYLE B" is the second preferred embodiment of the invention. Eiffel's tower (in Paris, France) 58 is shown for height comparison. When the H dimension is doubled, the electric power is increased four times and the city's real estate is eight times more. Investment capital is largely recovered by the selling and renting of the city's real estate.

Figure 28:
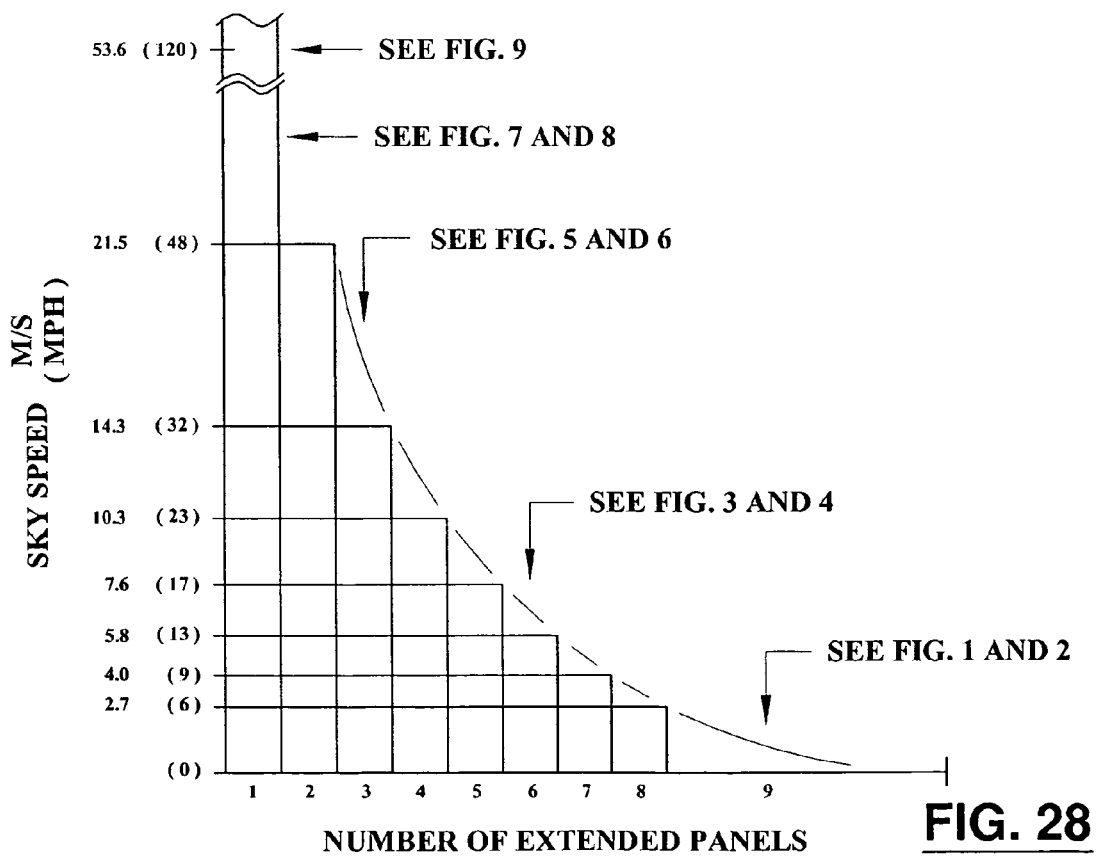
FIG. 28 is a diagram showing the number of panels which are extended outward (out of a total of nine panels) with respect to the sky speed.

FIG. 28 shows the number of panels which are extended outward (out of a total of nine panels) with respect to the sky speed.

Figure 29:
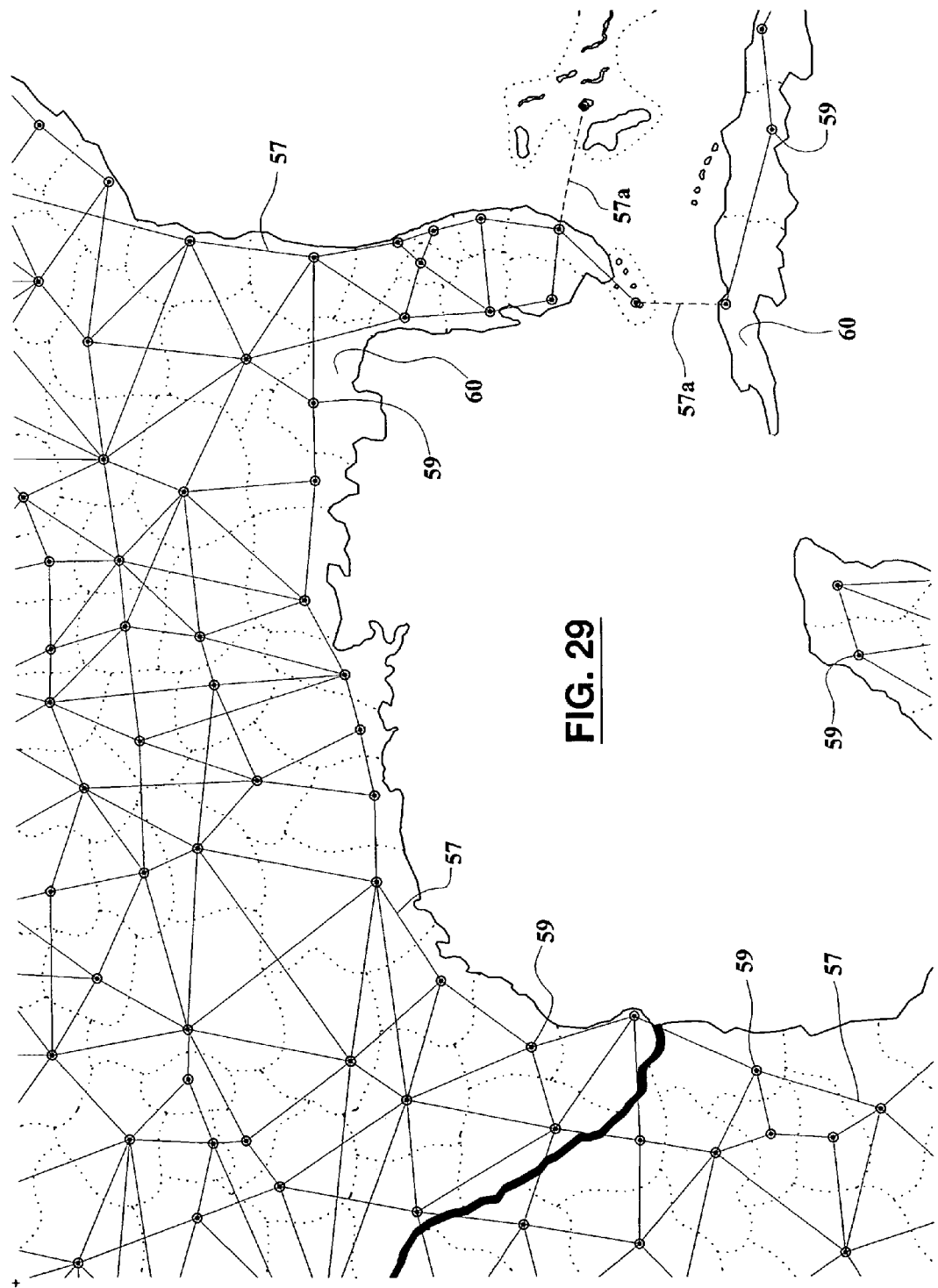
FIG. 29 is a schematic map of the Gulf of Mexico.
Figure 26:
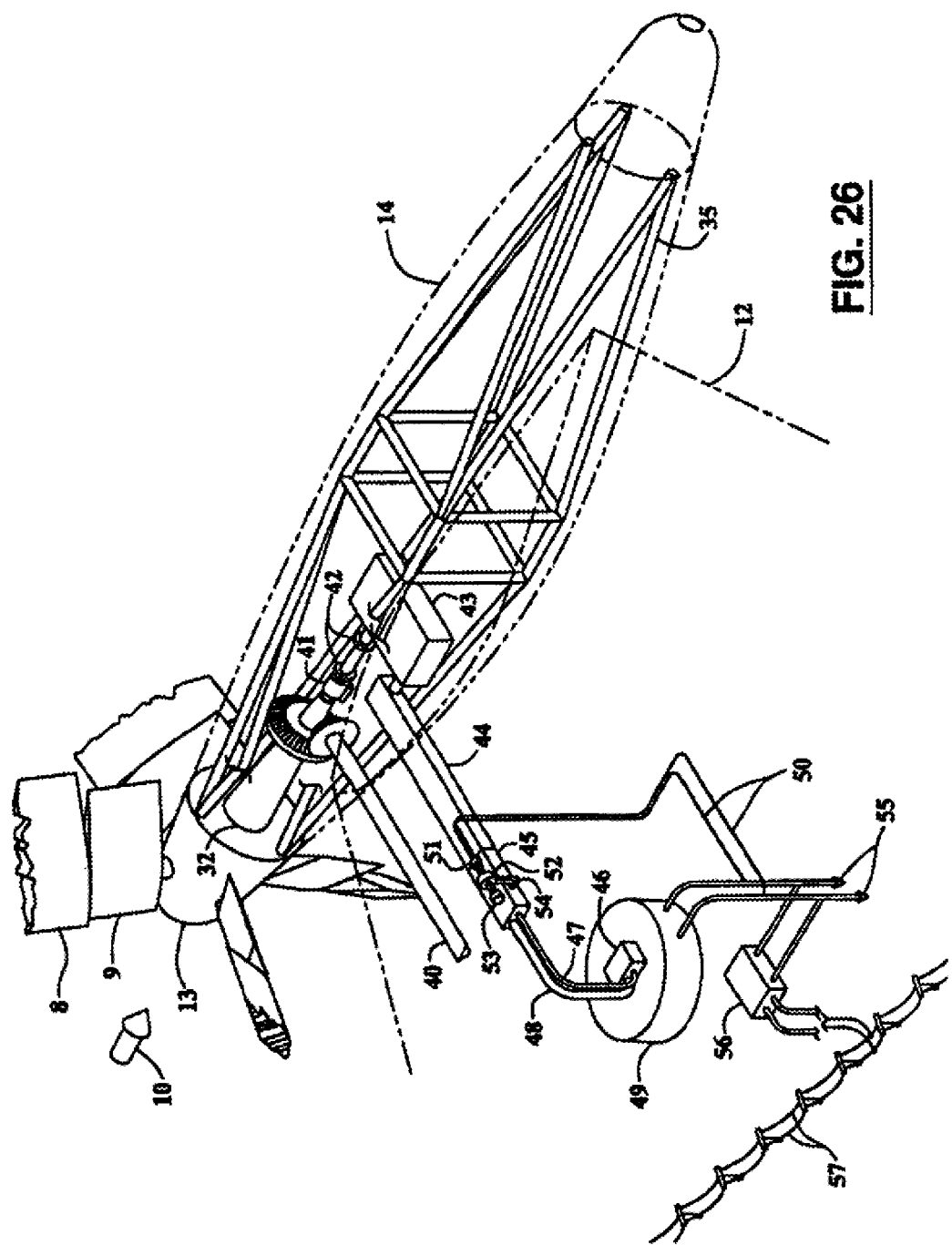

FIG. 29 is a map of the Gulf of Mexico, depicting hypothetical locations of my invention 59. Also shown is the worldwide D.C. power grid 57, including submerged portions 57*a*. The local area 60 is supplied with A.C. power from wires 55 in FIG. 26.

In operation, weather station 15 reports to the computer that the sky speed has increased over 2.7 meters/second (6 mph). (See FIG. 28). The computer decides that it is time to retract panel 1 over panel 2. The computer then instructs panel 1 to align itself to panel 2, using simultaneously servomotors 27 and 28. (See FIG. 21B). It then instructs servomotor 37 to relax wedge 38. (See FIG. 25). Spar 25 is now free to slide down spar 26. (See FIG. 21B and FIG. 25). As panel 1 falls over panel 2, servomotor 23 decelerates this fall by using ball screw 20 and ball nut 24. Panel 1 then reaches its retracted position gently. Servomotor 37 then reactivates wedge 38 and a snug fit between spars 25 and 26 is re-established. All of this action takes place within 90° of blade rotation as shown in FIG. 12 and FIG. 13 and it is predominantly gravity driven.

At a minimum, the sky turbine should have at least one shaft and at least three telescoping panels. Air current speed and direction may be detected by sensors that communicate with the computer. Preferably, the shafts in the front ends of the pods rotate independently of the shafts in the rear ends of the pods. Preferably, the shafts and blades in the front ends of the pods counter-rotate and the blades intermesh, and the shafts and blades in the rear ends of the pods counter-rotate and the blades intermesh.

It is to be understood that the present invention is not limited to the embodiments described above, but encompasses any and all embodiments within the scope of the following claims.

I claim:

1. A sky turbine, comprising:
  at least one shaft; and
  blades extending from the at least one shaft, each blade having at least three telescoping panels;
  wherein pressure of air current against the blades causes rotation of the at least one shaft, which is used to generate electricity;
  wherein the sky turbine is mounted above a city at the top of a tower containing the city, at a sufficiently high elevation that air current will be generally more rapid than on the ground.

2. A sky turbine, comprising:
  a plurality of shafts; and
  blades extending from each of the shafts, each blade having at least three telescoping panels;
  wherein the angles of the panels of the blades are adjustable;
  wherein there are two parallel pods, with each pod having two opposite ends containing one of the shafts, with the blades extending radially outward from the one shaft in each end;
  wherein the pods are retained on a wing that can pivot on a vertical axis; and
  servomotors cause the wing to turn so that the center of symmetry of the wing is parallel to the direction air is moving, and regulate changes in the speed of rotation of the shafts by causing the angles of the panels of the blades to change and the panels of the blades to move telescopingly, according to the speed of the air current.

3. The sky turbine according to claim 2, wherein when the blades telescope inward, the panels of the blades nearer to the one shaft are nested within the panels of the blades further from the one shaft.

4. The sky turbine according to claim 3, wherein the angles of the panels and the aspect ratio of each blade are adjustable while in operation.

5. The sky turbine according to claim 4, wherein one end of each pod is a front end, and the other end of each pod is a rear end, and the shafts in the front ends of the pods rotate independently of the shafts in the rear ends of the pods.

6. The sky turbine according to claim 5, wherein the shafts and blades on the front ends of the pods counter-rotate and the blades intermesh, and the shafts and blades on the rear ends of the pods counter-rotate and the blades intermesh.

7. The sky turbine according to claim 6, wherein planetary gears increase the speed of the shafts.

8. The sky turbine according to claim 7, wherein each of the panels of each of the blades is a symmetrical airfoil having:
  a. a chord (C) as its length,
  b. a width (B),
  c. a dimension (A) which is, $$A = \frac{2C}{3}$$

d. a leading edge radius (r), $$r = \frac{B^2}{2A}$$

e. a line (M) perpendicular to the chord (C) and located at the dimension (A) from a trailing edge,
  f. a dimension (X), $$X = \frac{A^3 - 3AB^2 + 2B^3}{4B(A - B)}$$

g. a radius (R) centered on the line (M), $$R = X + \frac{B}{2}$$

and h. a straight portion, tangent to the radius (R) and the trailing edge.

* * * * *

UNITED STATES PATENT AND TRADEMARK OFFICE
CERTIFICATE OF CORRECTION

| | | |
|---|---|---|
| PATENT NO. | : 7,131,812 B2 | Page 1 of 1 |
| APPLICATION NO. | : 11/290476 | |
| DATED | : November 7, 2006 | |
| INVENTOR(S) | : Manfred Karl Brueckner | |

It is certified that error appears in the above-identified patent and that said Letters Patent is hereby corrected as shown below:

Column 8, line 3, reading "1/2", should be changed to --1/2 A.--

Signed and Sealed this

Twenty-third Day of January, 2007

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 7,131,812 B2 |
| APPLICATION NO. | : 11/290476 |
| DATED | : November 7, 2006 |
| INVENTOR(S) | : Manfred Karl Brueckner |

Page 1 of 2

It is certified that error appears in the above-identified patent and that said Letters Patent is hereby corrected as shown below:

In (76) of the title page, the inventor's address, given as "5900 Rosedale Dr., Hyattsville, MD (US) 20782-2251", should be changed to --818 South 105th Street, Milwaukee, Wisconsin 53214-2544--

Delete drawing sheet 12 of 14 and substitute therefor the Drawing Sheets consisting of FIG 26 as shown on the attached pages.

Signed and Sealed this

Sixth Day of January, 2009

JON W. DUDAS
*Director of the United States Patent and Trademark Office*